United States Patent
Backer

(10) Patent No.: US 11,505,108 B2
(45) Date of Patent: Nov. 22, 2022

(54) VEHICLE MOUNTED ENCLOSURE

(71) Applicant: Eric M Backer, Durango, CO (US)

(72) Inventor: Eric M Backer, Durango, CO (US)

(*) Notice: Subject to any disclaimer, the term of this patent is extended or adjusted under 35 U.S.C. 154(b) by 0 days.

(21) Appl. No.: 17/035,140

(22) Filed: Sep. 28, 2020

(65) Prior Publication Data

US 2022/0097593 A1    Mar. 31, 2022

(51) Int. Cl.
*B60P 3/34* (2006.01)
*E04H 15/06* (2006.01)
*E04H 15/00* (2006.01)
*E04H 15/60* (2006.01)

(52) U.S. Cl.
CPC .............. *B60P 3/34* (2013.01); *E04H 15/008* (2013.01); *E04H 15/06* (2013.01); *E04H 15/60* (2013.01)

(58) Field of Classification Search
CPC ....... E04H 15/06; E04H 15/008; E04H 15/60; B60P 3/34
See application file for complete search history.

(56) References Cited

U.S. PATENT DOCUMENTS

| | | | | |
|---|---|---|---|---|
| 1,752,571 A * | 4/1930 | Olson | ...................... | E04H 15/06 135/88.14 |
| 1,935,948 A * | 11/1933 | Hyrup | ...................... | E04H 15/06 135/88.13 |
| 2,533,683 A * | 12/1950 | Neuhaus | .................. | E04H 15/06 5/119 |
| 2,793,646 A * | 5/1957 | Lefebvre | .................. | E04H 15/06 135/88.14 |
| 2,825,351 A * | 3/1958 | Thornton | ................ | E04H 15/06 135/88.14 |
| 2,870,774 A * | 1/1959 | Blosser | .................... | E04H 15/06 135/88.14 |
| 2,895,572 A * | 7/1959 | Brinck | ..................... | E04H 15/06 52/71 |
| 2,938,525 A * | 5/1960 | Mackinlay | .............. | E04H 15/06 135/88.14 |
| 3,186,419 A * | 6/1965 | Mccarroll | ............... | E04H 15/06 135/88.14 |
| 3,192,937 A * | 7/1965 | Carter | ..................... | E04H 15/06 135/88.14 |
| 3,231,161 A * | 1/1966 | Calthorpe | ............... | E04H 15/06 224/320 |
| 3,394,719 A * | 7/1968 | Hansson | .................. | E04H 15/06 135/88.14 |
| 3,438,670 A * | 4/1969 | Salmans | .................. | E04H 15/06 135/88.14 |
| 4,457,553 A * | 7/1984 | Larkin | .................... | B60R 15/00 135/114 |
| 5,669,655 A * | 9/1997 | Hammond | ............. | B60J 1/2011 296/165 |

* cited by examiner

*Primary Examiner* — Noah Chandler Hawk
(74) *Attorney, Agent, or Firm* — Bradley T. Fox

(57) ABSTRACT

The present invention provides an enclosure mounted to the top of a vehicle for camping or spending time outdoors. The enclosure generally has a roof that slides from a closed, packed position on top of the vehicle for transport to an open deployed position cantilevered off the back or side of the vehicle. The sliding roof contains a shelter that drops down to create a space next to the vehicle protected from the elements but with access into the vehicle.

10 Claims, 5 Drawing Sheets

VEHICLE MOUNTED ENCLOSURE

FIELD OF THE INVENTION

The present invention relates in general to an enclosure mounted on the top of a vehicle. In particular, the present invention is an enclosure mounted to a vehicle that consists of a roof that slides from the top of the vehicle to cover an area next to the vehicle and a shelter contained therein that can drop down and create a protected space with access to the interior of the vehicle.

BACKGROUND ART

Camping with a vehicle is a popular recreational activity. Many people use camper vans and motor homes, but they are expensive and fail to provide the same experience with nature as fabric tents. The prior art contains several pick-up truck or vehicle mounted fabric tents. For example, U.S. Pat. No. 9,567,767 provides for a vehicle roof-top tent that assembles on the roof of a vehicle. This requires the user to climb on top of the vehicle to enter the tent and climb down to exit the tent. This may not only be an inconvenience for some, but impossible for others. Another example of a prior art vehicle mounted tent is disclosed in U.S. Pat. No. 7,942,464. The tent is mounted in the bed of a pickup truck and assembles in both the bed of the truck and the area behind the vehicle. The significant drawback to this tent is that it does not permit the user to utilize the bed of the pickup for other uses such as storage for camping gear.

Therefore, there remains a need for an enclosure that can be mounted to a vehicle and transported on top of the vehicle when in a closed, packed position but then can be quickly and conveniently deployed at ground level but does not occupy the storage area of a vehicle allowing for the camper to utilize this area for other gear or equipment.

SUMMARY OF THE INVENTION

The present invention is an enclosure mounted to a vehicle. The enclosure is comprised of a roof that slides from a closed, packed position on top of the vehicle for transport to an open position on the back or side of the vehicle during use. The sliding roof contains a shelter that drops down to create a space next to the vehicle protected from the elements but with access into the vehicle.

In one embodiment of the invention, an enclosure mounted to the top of a vehicle comprises a base having a frame mounted to the top of the vehicle and two telescopic slide rails mounted to the frame, a roof structure coupled to a sliding element of each slide rail to permit the roof to be translated from a closed position over the top of the vehicle to an open position behind the vehicle, and a fabric shelter attached along the perimeter of the roof so that when the roof is in the open position the fabric shelter can be lowered down to create an enclosure at ground level. When the enclosure is deployed in this manner, one has access to the interior of the vehicle through the vehicle's rear opening.

In another embodiment of the invention, the base of the enclosure mounted to the top of a vehicle is mounted to the top of a pickup truck cap. In this embodiment, the enclosure is deployed off of the rear of the pickup truck and assembled behind the vehicle. The enclosure has a shelter comprised of three fabric walls that comprise the rear and side walls of the enclosure and a fourth fabric wall that fits snugly around the opening of the truck cap and truck bed to permit access to the truck bed while creating a fourth wall around the rear of the truck.

In still another embodiment, the roof is further comprised of two wings that extend from a closed stored position within the roof to an open position that provides a roof with greater coverage and the enclosure with larger interior space. Additionally, one or more support legs maybe incorporated on the outside edge of each wing to assist in supporting both the roof and the wings in an open position. This larger shelter can be completed with fabric walls in the manner described above.

It will be appreciated by those skilled in the art that the present invention is not limited to any particular arrangement described above or below.

DETAILED DESCRIPTION OF INVENTION

Figure 1:
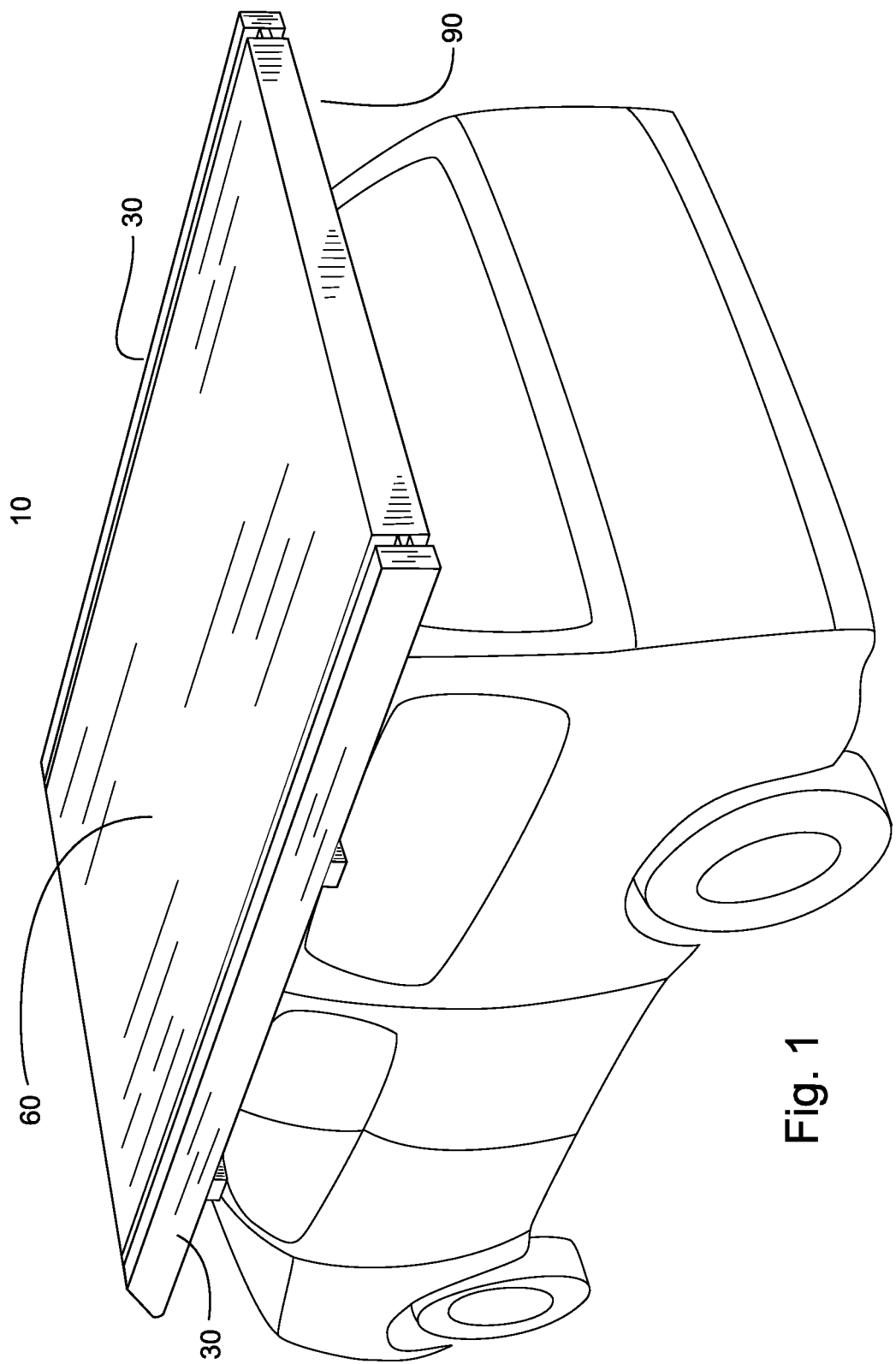
FIG. 1 is a perspective view of one embodiment of the present invention in a closed, stored position.
Figure 2:
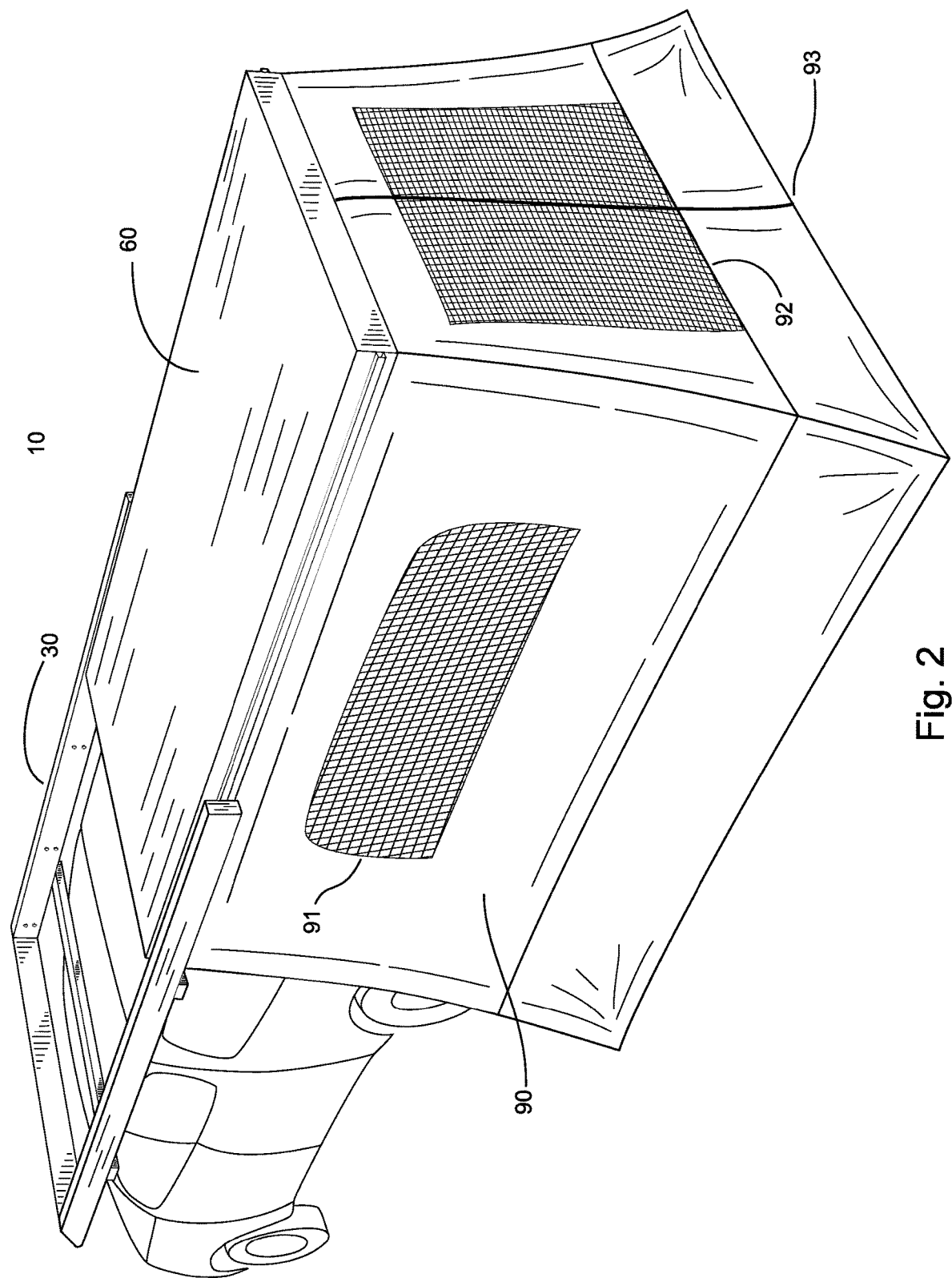
FIG. 2 is a perspective view of one embodiment of the present invention in its fully deployed position.

Referring now to figures, FIG. 1 and FIG. 2 show one embodiment of the present invention. FIG. 1 shows an enclosure mounted to the top of a vehicle in the closed, stored position. The enclosure 10 of this embodiment comprises a base 30, a roof 60, and a shelter 90. In this closed position, the shelter 90 is stored in the roof 60, and the roof 60 is fixed atop the base 30.

Figure 4:
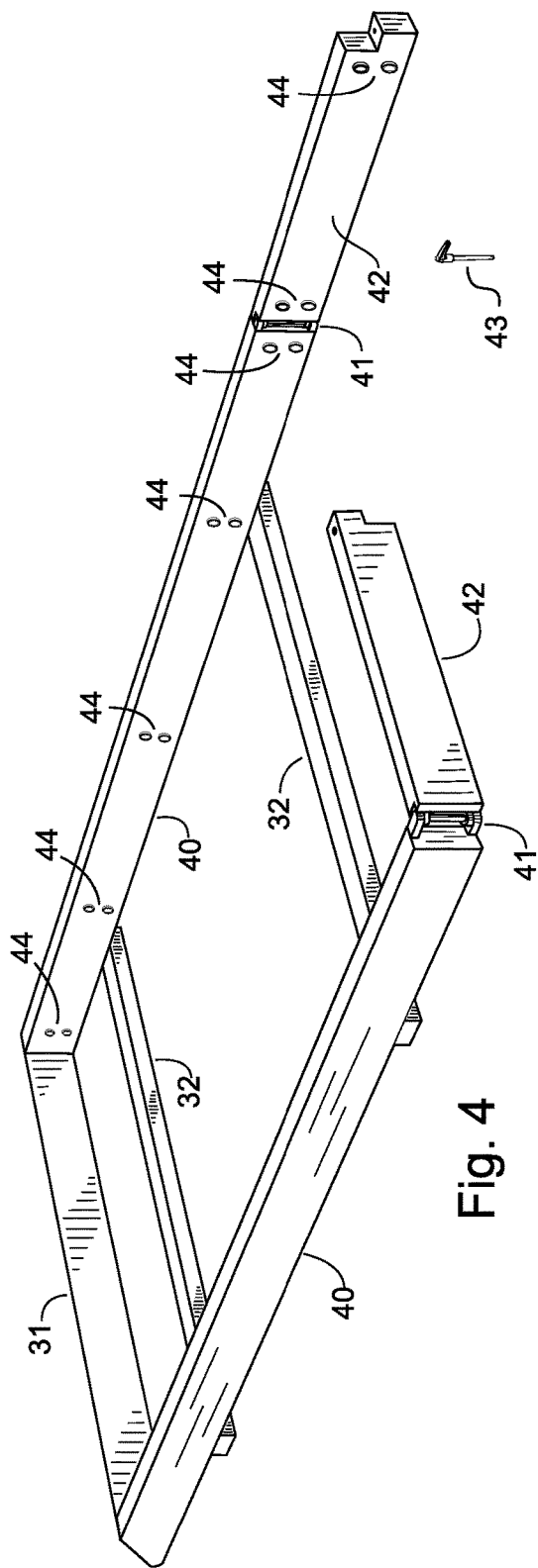
FIG. 4 is a perspective view of an embodiment of the frame of the present invention.

FIG. 2 shows an embodiment of the invention in the open position. When in the open position, the roof 60 cantilevers off the vehicle, and the shelter 90 can be lowered to create the enclosure 10. The base 30 attaches the enclosure 10 to the vehicle while permitting the roof 60 to be deployed off the edge of the vehicle. Referring to FIG. 4, the base 30 is comprised of a frame 32 and slide rails 40. The base 30 may be manufactured from steel, wood, or other sufficient structural material. The frame 32 is configured to secure the base 30 to the vehicle. The base 30 may be further comprised of an aerodynamic front fairing 31. In one embodiment, the frame 32 is comprised of crossbars configured to secure the base to the vehicle. The crossbars of frame 32 are designed to attach the base to pre-existing roof rack bars that typically run laterally across the vehicle. Roof rack bars may be OEM bars attached to the vehicle or any number of aftermarket roof racks. In one embodiment, the frame 32 is adapted to rest longitudinally along the roof rack bars 34 in a manner that supports them substantially along their length. In another embodiment the frame 32 is directly attached to the vehicle roof.

Figure 5A:
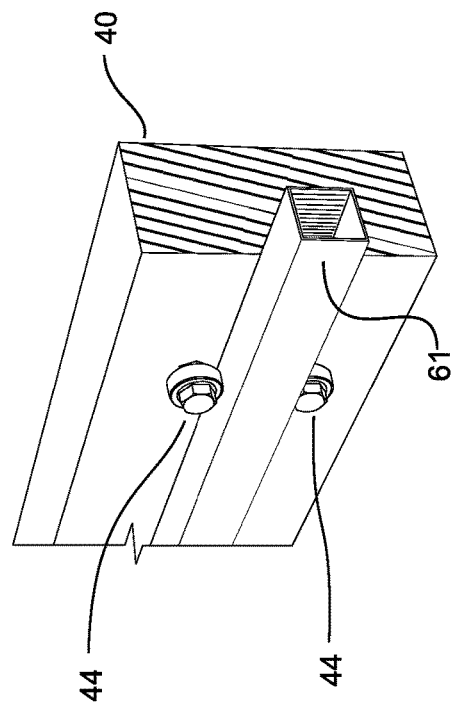
FIG. 5a is a perspective view of an embodiment of a slide rail of the present invention.

The slide rails 40 are attached to the frame by way of suitable fasteners such as a bolts. In an alternative embodiment, the slide rails 40 are welded to the frame 32. One of skill in the art will recognize that the slide rails 40 may comprise any telescoping or extending sliding mechanism to permit the roof 60 to translate from a stored position over the vehicle to an open position suspended off the vehicle. In an embodiment of the invention shown in FIG. 5a, the slide rails 40 are comprised of a telescoping linear bearings 45 that permit smooth translation of the shelter 60 from a stored position to an open position. In an alternative embodiment, a single heavy-duty slide rail 40 is used to provide translation. The telescoping slide bearings 45 may be made from any suitable material that accommodates the weight of the roof 60. The bearings of the slide rail 40 may be a ball bearing or roller bearing type of mechanism. The slide rails 40 may be radially mounted or axially mounted. In an alternative embodiment, the slide rails 40 are comprised of telescoping linear bushings. The bushing may be made of a suitable material such as an Oilite material or other suitable low friction material.

Figure 5B:
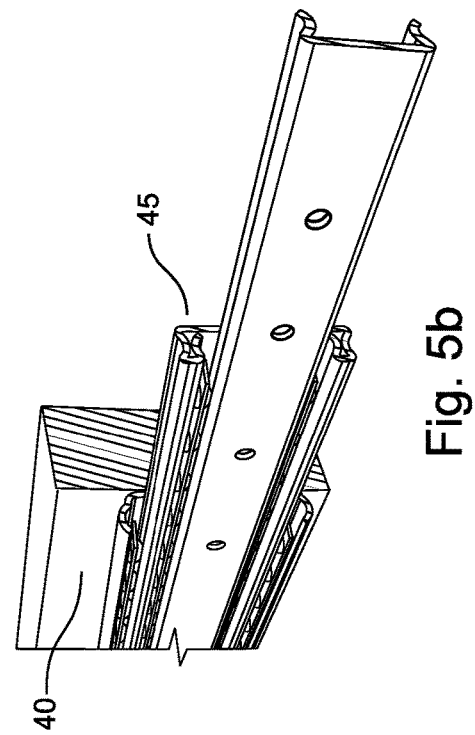
FIG. 5b is a perspective view of an alternative embodiment of a slide rail of the present invention.

FIGS. 4 and 5b show a detail of the sliding system used in an alternative embodiment. The slide rails 40 are comprised of pairs of bearings 44. A guide member 61, which is attached on each side of the roof 60, runs between the bearings 44 thus supporting the roof in both its closed and open positions. The inside surface of the slide rails 40 may be utilize a low friction surface to minimize friction as the roof 60 slides in and out relative to the base 30.

In an embodiment of the invention, the base 30 is comprised of a unitary frame 32 and slide rail 40 assembly that is configured to be fixed upon either a factory vehicle roof rack or and aftermarket roof rack. The frame 32 of base 30 rests upon roof rack crossbars 34 and can be secured to the crossbars 34. The slide rails 40 are fixed to the frame 32 in a rigid manner to support the roof 60. It will be fully understood by one of skill in the art the that the base 30 and its corresponding elements can be constructed and arranged from different materials and different dimensions so that the roof 60 may be securely supported and transported in a closed position over the top of the vehicle or pickup truck cap and also capable of translating to a position suspended off of the vehicle to an open position the permits the roof 60 to be deployed to create the enclosure 10.

FIG. 4 shows an embodiment of the base 30 of the invention. In this embodiment the side rails 40 have hinges 41 to permit an extension of the slide rails 40. When unfolded, side rail extensions 42 give more support to the roof 60 in its deployed position. This allows the entire invention to be placed further forward on the vehicle and still clear the back of the vehicle when moving into the deployed position. When the extensions 42 are swung into their closed position, a pin 43 drops into the holes on their ends and locks them closed. Thus, the slide rails 40 and the front fairing 31 completely surround and immobilize the roof 60.

The roof 60 in one embodiment of the invention is a rigid structure attached to the slide rails 40 that creates the top of the enclosure 10 when overhanging the vehicle. Typically, the roof 60 may be manufactured from wood, fiberglass, or another similar material. The roof 60 is typically the size of the top of the vehicle, but it may be larger or smaller than the top of the vehicle or the cap of the pickup truck. The roof 60 has one or more attachment points to attach the shelter walls 90 when they are deployed to when the enclosure 10 is set up. The roof 60 may also have one or more support legs 62 that extend from the distal portion of the overhung enclosure 10 to the ground to further support the roof 60 in its overhung position. The legs 62 may be permanently affixed to the roof 60, or they may be removably fixed and stored in a different location. One of skill in the art would understand that one or more support legs 62 maybe employed based upon design choice and other factors that would influence the need for more or less legs 62 such as weight, material, or size of the roof 60 or the design of the rails 40. The support legs 62 maybe telescoping, folding, or another design that permits adjustability in length between the support surface and the underside of the roof 60. The support legs 62 may have attachment points for the shelter 90 such as hook and latch material 94 or opening to accommodate attachment clips or other similar devices.

Figure 6:
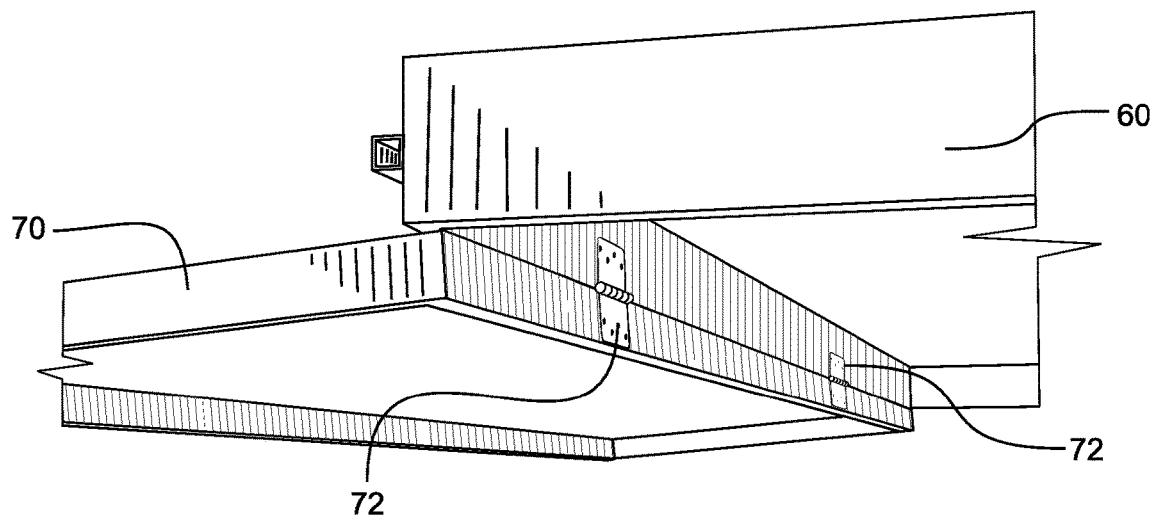
FIG. 6 is a view of an embodiment of the roof of the present invention.

In another embodiment shown in FIG. 6, the roof 60 is further comprised of a wing 70. The wing 70 is pivotably attached to the roof 60 by a hinge mechanism 72 such that in the closed position the wing 70 is stored in the roof 60 and when in use the wing 70 pivots to an open position creating an extended covered space. In this embodiment, at least one support leg 62 is used to support the wing 70 in an open position. Further the shelter 90 in such an embodiment is draped from the wing 70 to create a larger enclosure 10 without increasing the overall dimensions of the roof 60 in the closed position on the vehicle. The joint between the wing 70 and the main portion of the roof 60 may also include a locking mechanism to ensure the wing 70 does not collapse unwantedly. In an alternative embodiment, a locking mechanism is sufficiently able to hold the wing 70 in an open position relative to the remaining roof 60 such that the support leg 62 is not necessary.

Figure 3:
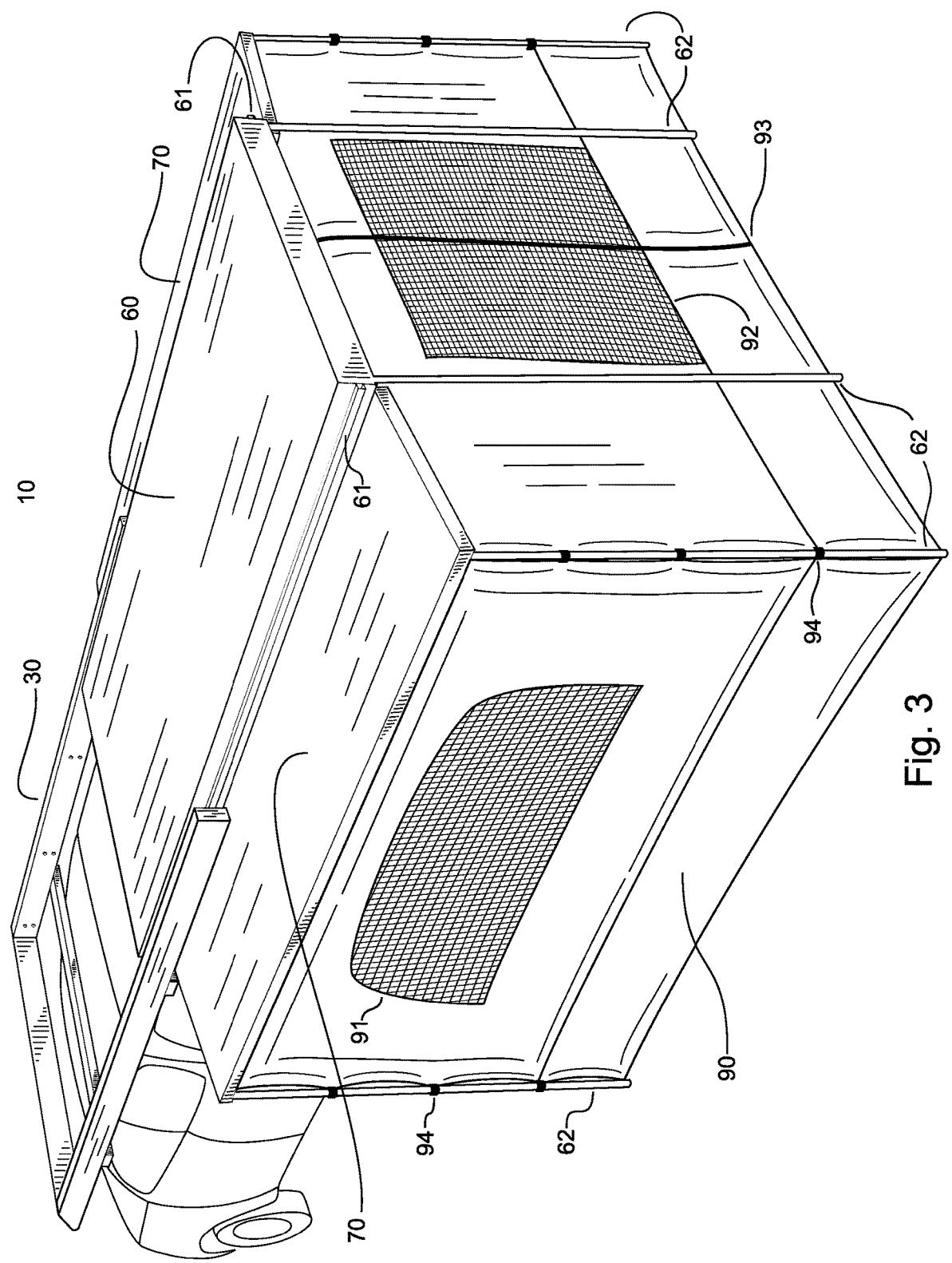
FIG. 3 is a perspective view of an alternative embodiment of the present invention in its fully deployed position.

In another embodiment shown in FIG. 3, the roof 60 comprises two wings 70 extending from main portion of the roof 60. As in other embodiments, support legs 62 may be employed to support the wings in the open position. One of skill in the art would recognize that the wing 70 may include sub-wings that continue to extend the overall coverage of the shelter and therefore expand the dimensions of the enclosure 10 when deployed without expanding the dimensions of the enclosure 10 when in the closed stored position. In yet another embodiment, a wing may extend from the rear of the main roof 60 extending the overall length of the enclosure 10. In still another embodiment, the wings may slidably translate from the main portion of the roof 60 extending one side of the roof 60, both sides of the roof 60 and/or both sides and the rear of the roof 60.

In still another embodiment, the main portion of the roof 60 may be configured to divide and allow one or more additional leaves to be added to expand the roof 60. One will recognize that embodiments that extend the perimeter of the roof 60 in the open position while maintaining a more compact dimension of the roof 60 in the closed position are within the scope of this invention.

In another embodiment of the invention, the roof 60 is comprised of a roof frame covered by a cover material. The roof frame provides a structure and the cover material provides protection from the weather forming the roof 60. The other features and elements of the design discussed above maybe adapted to function with this enclosure embodiment.

The shelter 90 is comprised of walls attached to the outer perimeter of the roof 60 forming the enclosure 10. In an embodiment of the invention, the shelter 90 is affixed to the roof 60 when the enclosure 10 is stored. Following movement of the roof 60 to the open position, the shelter 90 is deployed to create the enclosure 10.

In another embodiment, the shelter 90 is divided in two and each half is stored in the wing 70 when the invention is closed. When deployed, the shelter 90 drops down from each wing 70 and is then attached to the main roof 60 with hook and latch or some other attachment.

The shelter 90 is made from a waterproof material to protect the occupants of the enclosure 10 from rain or weather. The shelter 90 may be secured to the ground via stakes or secured to the support legs 62 if support legs are incorporated by hook and latch 94. The shelter 90 may have windows made from clear material. The shelter 90 may have mesh windows 91 backed by waterproof material that opens with a zipper. The end of the shelter 90 may also have a mesh layer 92 backed by a waterproof layer with a full-length zipper 93 creating an entrance door.

Figure 7:
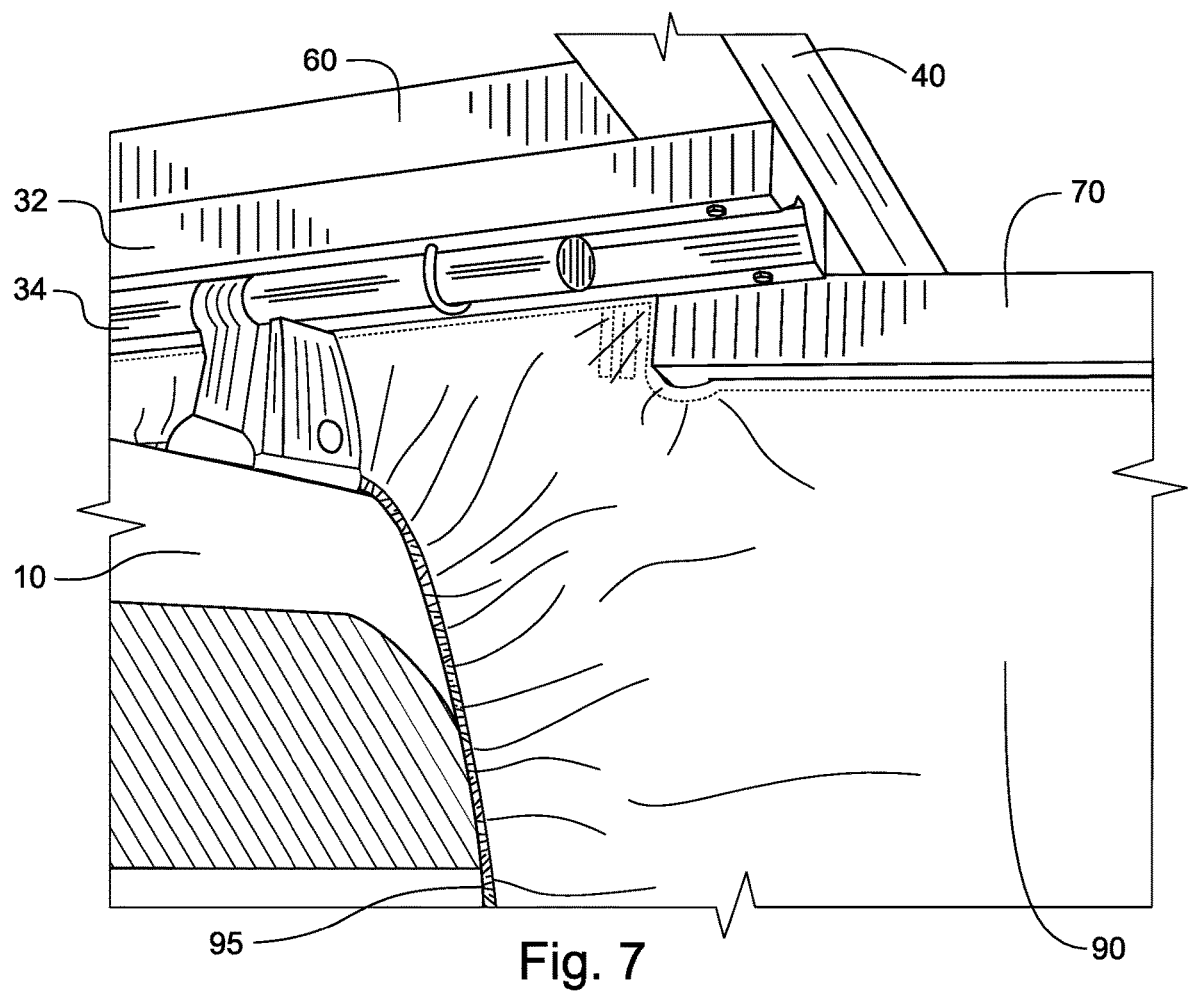
FIG. 7 is a section view showing elements of the underside of the enclosure of the present invention.

Referring to FIG. 7, in one embodiment, the portion of the shelter 90 nearest the vehicle may be shaped to accommodate and mate with the vehicle using an opening 95 that stretches around and seals to the vehicle. The opening may be elastic to better fit the vehicle. For example, in the instance where the enclosure 10 is on the roof of a pickup truck, a portion of the shelter 90 may be configured to allow access to the pickup truck bed while still closing out the elements. Further, the opening 95 of the shelter 90 that allows access to the vehicle may seal along the vehicle to form a weather resistant barrier. This opening may also be backed by a zippered waterproof panel that allows the enclosure to be closed to the weather even when the vehicle is not present.

The shelter 90 may also be partially or completely rigid. In one embodiment the wings 70 contain rigid walls that are contained within the wing roof when closed but fold down and unhinge to form a rigid wall when deployed. Similar walls could also be contained within the main roof 60 to make the back wall rigid.

The shelter 90 may be removable. In an embodiment, the shelter 90 is stored separate from the roof 60 and attached, if desired, once the shelter has been moved to an open position. In this instance, the roof 60 acts to shade sun while permitting an opening to the outside. The shelter 90 may be made of a screen material to keep the enclosure 10 cooler while blocking insects.

In an alternative embodiment of the enclosure 10, the roof 60 of the enclosure 10 has support legs 62 at a location on the roof 60 proximal to the base 30 and at a location on the roof 60 distal from the base 30. In this embodiment, the roof 60 can be fully supported on support legs 62 such that the roof 60 can be decoupled from the slide rails 40 and the vehicle removed. This means when fully deployed the roof is no longer cantilevered out from the vehicle, instead the vehicle end of the roof 60 and the distal end of the roof 60 are resting support legs 62 so that the vehicle can be removed and the enclosure 10 can remain deployed.

Although embodiments of the present invention have been shown in the drawings, it will be understood that the invention is not limited to the embodiments disclosed, but is capable of numerous rearrangements, modifications and substitutions without departing from the spirit of the invention as set forth and defined by the claims.

What is claimed is:

1. An enclosure mounted to the top of a vehicle comprising:
    a base having a frame coupled to the exterior of a vehicle and a first and a second slide rail coupled to the frame, the first and a second slide rails include hinged segments that pivot from a closed position to an extended position, and when the hinged sections of the slide rails are in the extended position, allow the enclosure to translate from a stored position over the vehicle to an open cantilevered position off of the vehicle and are capable of fully supporting the enclosure when the enclosure is in the open cantilevered position;
    a covered roof coupled to the slide rails; and
    a shelter attached to the covered roof and capable of being lowered down when the enclosure is in the open cantilevered position.

2. The enclosure of claim 1 wherein the covered roof is formed from a rigid material.

3. The enclosure of claim 1, wherein the hinged segments of the first and second side rails extend beyond the vehicle and allow the enclosure to be located farther off of the vehicle when the enclosure is in the open cantilevered position.

4. The enclosure of claim 3, wherein the covered roof further comprises a wing portion coupled to the covered roof to expand the covered roof when the enclosure is in the open cantilevered position.

5. The enclosure of claim 3, wherein the covered roof further comprises a first wing portion and a second wing portion coupled on each side of the covered roof to expand the covered roof when the enclosure is in the open cantilevered position and fully contain the shelter when the enclosure is in the stored position.

6. An enclosure mounted to the top of a vehicle comprising:
    a base having a frame coupled to the exterior of a vehicle and a first and a second slide rail coupled to the frame that allow the enclosure to translate from a stored position over the vehicle to an open cantilevered position off of the vehicle and are capable of fully supporting the enclosure when the enclosure is in the open cantilevered position;
    a covered roof coupled to the slide rails, the covered roof having a wing portion coupled to the covered roof to expand the covered roof when the enclosure is in the open cantilevered position; and
    a shelter attached to the covered roof and capable of being lowered down when the enclosure is in the open cantilevered position.

7. The enclosure of claim 6, wherein the covered roof further comprises a second wing portion coupled to the side of the roof opposite the wing portion.

8. An enclosure mounted to the top of a pickup truck comprising:
    a frame coupled to the exterior of a pickup truck cap and a first and a second slide rail coupled to the frame that allow the enclosure to translate from a stored position over the pickup truck cap to an open cantilevered position off of the pickup truck cap and are capable of fully supporting the enclosure when the enclosure is in the open cantilevered position;
    a covered roof coupled to the slide rails, the covered roof having a wing portion coupled to the covered roof to expand the covered roof when the enclosure is in the open cantilevered position; and
    a shelter attached to the covered roof and capable of being lowered down when the enclosure is in the open cantilevered position.

9. The enclosure of claim 8, wherein the covered roof further comprises a second wing portion coupled to the side of the roof opposite the wing portion.

10. The enclosure of claim 8 wherein the covered roof is formed from a rigid material.

* * * * *